(12) United States Patent
Chen et al.

(10) Patent No.: US 8,988,707 B2
(45) Date of Patent: Mar. 24, 2015

(54) METHOD OF MANAGING PLURAL PRINT JOBS BY USING A PRINT JOB GROUP LIST

(75) Inventors: Yu-Shing Chen, Cupertino, CA (US); Ann Qiongying Feng, San Jose, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 379 days.

(21) Appl. No.: 13/017,521

(22) Filed: Jan. 31, 2011

(65) Prior Publication Data

US 2012/0194852 A1 Aug. 2, 2012

(51) Int. Cl.
*G06F 3/12* (2006.01)

(52) U.S. Cl.
CPC ............ *G06F 3/1288* (2013.01); *G06F 3/1262* (2013.01); *G06F 3/1296* (2013.01); *G06F 3/1203* (2013.01); *G06F 3/1212* (2013.01); *G06F 3/1263* (2013.01)
USPC ......... 358/1.15; 358/1.9; 358/1.13; 358/1.16; 358/1.18

(58) Field of Classification Search
None
See application file for complete search history.

(56) References Cited

U.S. PATENT DOCUMENTS

2008/0225329 A1*  9/2008  Tanaka .................... 358/1.15
2011/0134476 A1*  6/2011  Takashima ............... 358/1.15

* cited by examiner

*Primary Examiner* — Miya J Cato
(74) *Attorney, Agent, or Firm* — Buchanan Ingersoll & Rooney PC

(57) ABSTRACT

A method of managing a plurality of print jobs, which includes the steps of: receiving a plurality of print jobs from one or more client devices, each of the plurality of print jobs having one or more print job attributes; creating a print job group list of the plurality of print jobs before the plurality of print jobs is processed by a printer controller; processing the plurality of print jobs on the printer controller for printing by an image forming apparatus; and printing one or more of the plurality of print jobs based on a printing sequence generated from the print job group list.

20 Claims, 5 Drawing Sheets

| Job ID | Job name | Time | Size |
|---|---|---|---|
| 10001 | APPLE | 10:07 | 310KB |
| 10002 | ORANGE | 10:07 | 90KB |
| 10003 | APPLE | 10:08 | 271KB |
| 10004 | APPLE | 10:08 | 985KB |
| 10005 | PEAR | 10:09 | 461KB |

FIG. 2

| Job ID | Job name | Time | Size |
|---|---|---|---|
| 10003' | APPLE | 10:23 | 792KB |
| 10005' | PEAR | 10:23 | 612KB |
| 10002' | ORANGE | 10:23 | 182KB |
| 10001' | APPLE | 10:24 | 2135KB |
| 10004' | APPLE | 10:24 | 3102KB |

FIG. 3

METHOD OF MANAGING PLURAL PRINT JOBS BY USING A PRINT JOB GROUP LIST

FIELD OF THE INVENTION

The present invention relates to a method of managing plural print jobs by using a job list, and more particularly, to a method of managing plural print jobs by using a job list, which can maintain the job sequence regardless of its processing order, and also allows users to create a printing sequence for any print job or job order.

BACKGROUND OF THE INVENTION

As new generation printer controllers become more powerful, user's can do a lot more processing to the jobs stored on the printer controller than before. However, keeping a consistent job order after the processing is a difficult challenge. Currently, many printer controllers allow users to sort job order by job attributes, e.g. job name, processing time, etc. However, due to the complexity of job processing functions, which can be performed on the controller, there is no way to guarantee the sequence after the job processing. Sometimes several jobs may have the same file name and/or the same process time because of the speed of the print controller's CPU (central processing unit) there is no way to differentiate the time tick between two processed jobs.

Accordingly, for these reasons, and others, it is desirable to have a system and method of managing plural print jobs by using a job list, which can maintain the job sequence regardless of its processing order, and which also allows users to create a desired printing sequence based on the job list.

SUMMARY OF THE INVENTION

In consideration of the above issues, it would be desirable to improve management of a plurality of print jobs by creating a print job group list of the plurality of print jobs, and wherein the print job group list is generated before processing of each of the plurality of print jobs a printer controller so as to maintain control over a desired printing sequence.

In accordance with an exemplary embodiment, a method of managing a plurality of print jobs, comprises: receiving a plurality of print jobs from one or more client devices, each of the plurality of print jobs having one or more print job attributes; creating a print job group list of the plurality of print jobs before the plurality of print jobs is processed by a printer controller; processing the plurality of print jobs on the printer controller for printing by an image forming apparatus; and printing one or more of the plurality of print jobs based on a printing sequence generated from the print job group list.

In accordance with a further exemplary embodiment, a system for managing a plurality of print jobs: at least one client device, which generates at least one print job; and a printer controller having executable instructions for managing a plurality of print jobs, the instructions comprising: receiving the plurality of print jobs from one or more client devices, each of the plurality of print jobs having one or more print job attributes; creating a print job group list of the plurality of print jobs before the plurality of print jobs is processed by a printer controller; processing the plurality of print jobs on the printer controller for printing by an image forming apparatus; and printing one or more of the plurality of print jobs based on a printing sequence generated from the print job group list.

In accordance with another exemplary embodiment, a computer program product comprising a non-transitory computer usable medium having a computer readable code embodied therein for managing a plurality of print jobs, the computer readable program code configured to execute a process, the process comprising the steps of: receiving a plurality of print jobs from one or more client devices, each of the plurality of print jobs having one or more print job attributes; creating a print job group list of the plurality of print jobs before the plurality of print jobs is processed by a printer controller; processing the plurality of print jobs on the printer controller for printing by an image forming apparatus; and printing one or more of the plurality of print jobs based on a printing sequence generated from the print job group list.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 is an illustration of a list of print jobs for an image forming apparatus or printer in accordance with an exemplary embodiment.

FIG. 3 is an illustration of a list of print jobs for an image forming apparatus or printer in accordance with a further embodiment.

DESCRIPTION OF THE PREFERRED EMBODIMENTS

Figure 1:
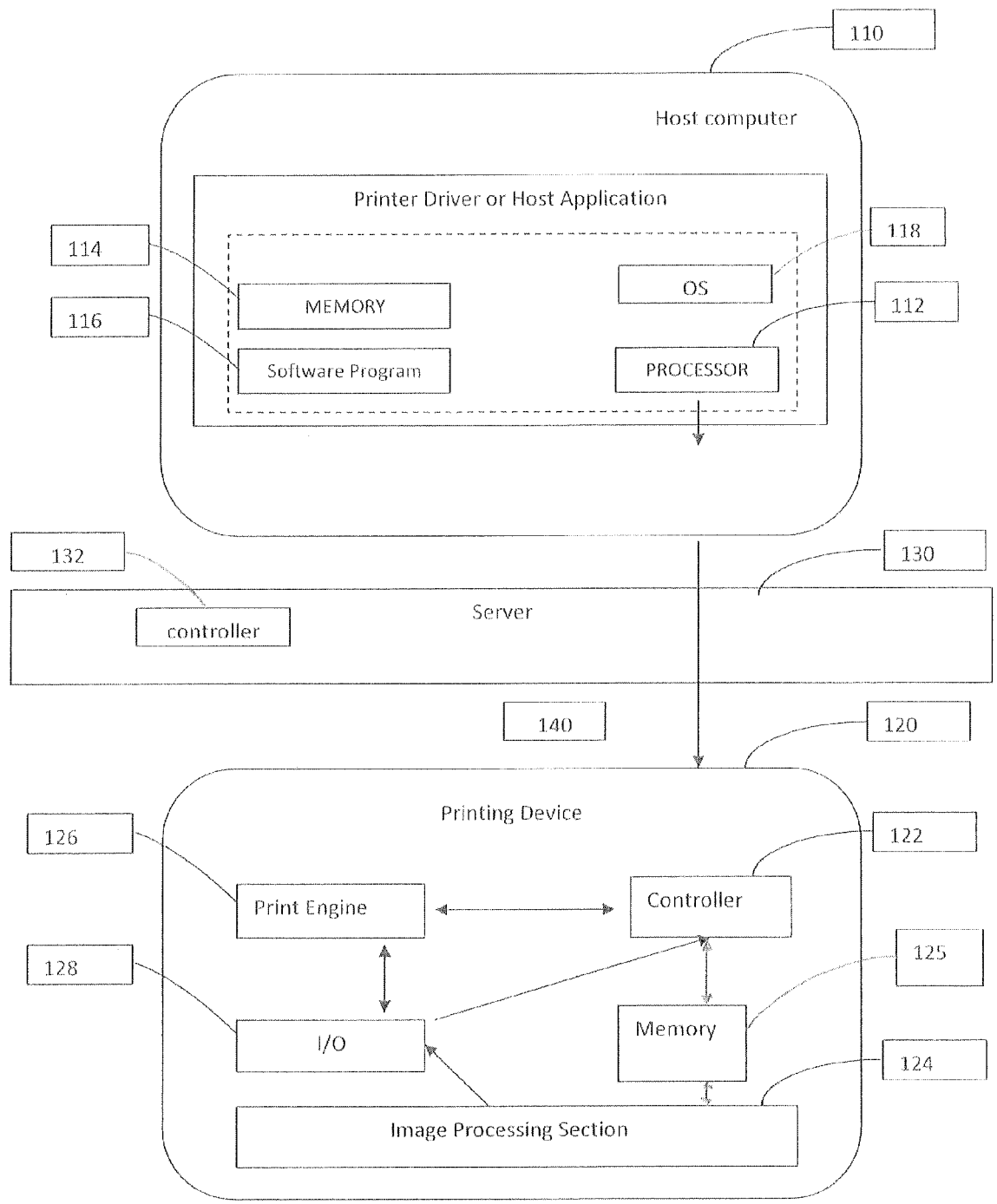
FIG. 1 is an illustration of a data processing system, which includes a computer device, a server, and an image forming apparatus or printer in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is an illustration of a data processing system 100, which includes a client device 110 (or host computer) and an image forming apparatus 120 (or printer) connected to the client device 110. The client device 110 preferably includes a processor or central processing unit (CPU) 112, one or more memories 114 for storing software programs 116 and data (such as files to be printed). The client device 110 also includes an operating system (OS) 118, which manages the computer hardware and provides common services for efficient execution of various software programs 116. The processor or CPU 112 carries out the instructions of a computer program, which operates and/or controls at least a portion of the functionality of the client device 110. It can be appreciated that examples of client devices 110 include and are not limited to personal computers, image forming apparatuses, routers, and/or personal digital assistants (PDAs).

In accordance with an exemplary embodiment, the image forming apparatus is preferably in the form of an industrial image forming apparatus or multi-functional printer 120 connected to the client device 110. The client device 110 submits print jobs to the image forming apparatus (printer or printing device) 120 by transmitting data representing the documents to be printed and information describing the print job. The image forming apparatus (i.e., printer/printing device) 120 typically includes a printer controller (or controller) 122, an image processing section (or data dispatcher) 124, a memory section 125 preferably in the form of a hard disk drive (HDD), a print engine 126, and an input/output (I/O) section 128.

The controller 122 typically includes a central processing unit (CPU), a random access memory (RAM), and a read only memory (ROM). The central processing unit is configured to execute a sequence of stored instructions (i.e., a computer program). It can be appreciated that the controller 122 also includes an operating system, which acts as an intermediary between the software programs and hardware components within the image forming apparatus 120. The operating system (or OS) manages the computer hardware and provides common services for efficient execution of various application software. In accordance with an exemplary embodiment, the controller 122 processes the data and job information received from the client device 110 to generate a print image.

The image processing section 124 carries out image processing under the control of the controller 122, and sends the processed print image data to the print engine 126. The print engine 126 forms an image on a recording sheet based on the image data sent from the image processing section 124. The I/O section performs data transfer with the host computer 110. The controller 122 is programmed to process data and control various other components of the image forming apparatus or printer 120 to carry out the various methods described herein. The hard disk drive (HDD) or storage device stores digital data and/or software programs for recall by the controller 122. In accordance with an exemplary embodiment, the digital data includes resources, which can include graphics/images, logos, form overlays, fonts, etc.

The input/output (I/O) port 128 provides communications between the printer section and the client device 110 and receives page descriptions (or print data) from the host for processing within the image forming apparatus 120. In accordance with an exemplary embodiment, the operation of printer section commences when it receives a page description from the client device 110 via I/O port 128 in the form of a print job data stream. The page description may be any kind of page description languages (PDLs), such as PostScript® (PS), Printer Control Language (PCL), Portable Document Format (PDF), XML Paper Specification (XPS), and so on. Examples of image forming apparatuses 120 consistent with exemplary embodiments of the invention include industrial printers, and/or multi-function printers or peripherals (MFP).

In accordance with an exemplary embodiment, the system 100 can also include a print server (or print controller server) 130. The print server 130 is preferably a computer or device that is connected to one or more image forming apparatuses (or printers) 120 and to one or more client devices (or computers) 110 over a network 140, and can accept print jobs from the one or more client devices 110 and send the print jobs to the appropriate image forming apparatuses (or printer) 120. It can be appreciated that the print server 130 include a controller (or printer controller) 132, which processes the one or more print jobs received from the client device 110 for printing by the image forming apparatus 120. The processing of the one or more print jobs may include a conversion of the one or more of print jobs from a PDL, which is a higher level language, to a lower level printer native format, such as bitmap image data. The controller 132 preferably includes a central processing unit (CPU), a random access memory (RAM), and a read only memory (ROM). The central processing unit is configured to execute a sequence of stored instructions (i.e., a computer program). It can be appreciated that the controller 132 also includes an operating system, which acts as an intermediary between the software programs and hardware components within the print server 130.

The client device 110, the image forming apparatus (or printer) 120, and the server 130 are preferably connected to one another via a network 140. Examples of the network 140 consistent with embodiments of the invention include, but are not limited to, the Internet, an intranet, a local area network (LAN) and a wide area network (WAN). The client device 110, the image forming apparatus 120, and the print server 130 can also be connected with a wire and/or wireless technology by using radio frequency (RF) and/or infrared (IR) transmission.

FIG. 2 is an illustration of a list of print jobs 200 for an image forming apparatus 120 or print server 130 in accordance with an exemplary embodiment. As shown in FIG. 2, each of the plurality of print jobs 210 has one or more print job attributes 220, which can include a job identifier (Job ID) 222, a job name (Job name) 224, a time (Time) 226, and/or size of the print job (Size) 228. It can be appreciated that the time 226 can be the time of the sending of the print job to the printer controller 122, 132 for processing. The plurality of print jobs 210 are preferably submitted to a server 130 (and/or image forming apparatus 120) for processing and printing thereof. It can be appreciated that in the examples as shown herein, the plurality of print jobs 210 can be processed by a print controller 132 for printing, which is separate from the image forming apparatus. However, it can be appreciated that the print controller 122 can be part of, or contained within the image forming apparatus 120, such that a separate server (or printer server) 130 is not used and/or necessary.

The print jobs are sent by the one or more client devices 110 to the print controller 132 of the print server 130 for processing. The processing of each of the plurality of print jobs 210 typically includes receipt of the print job, which is a file or set of files that has been submitted to an image forming apparatus 120 for printing. It can be appreciated that print jobs are typically identified by a unique number, and are assigned to a particular destination, usually an image forming apparatus (or printer) 120 and can also have options associated with them such as media size, number of copies and priority. The controller 122, 132 typically receives the print job in the form of a bitmap, a vector graphic format (shapes) or other known print format, which must then be processed by the controller 122, 132 before the print job can be printed by the image forming apparatus 120.

FIG. 3 is an illustration of a list of print jobs 300 for a print server 130 (or image forming apparatus 120) after the printer controller 132 has processed the plurality of print jobs 310 (i.e., performs a rasterizing process and other job manipulations) for printing by the print engine 126 of the image forming apparatus 120. As shown in FIG. 3, once the controller 132 has performed the rasterizing process (and other job manipulations), the original order of receipt of the plurality of print jobs 210 is lost. Thus, it may be impossible to print the plurality of print jobs 210 in the original print job order.

Figure 4:
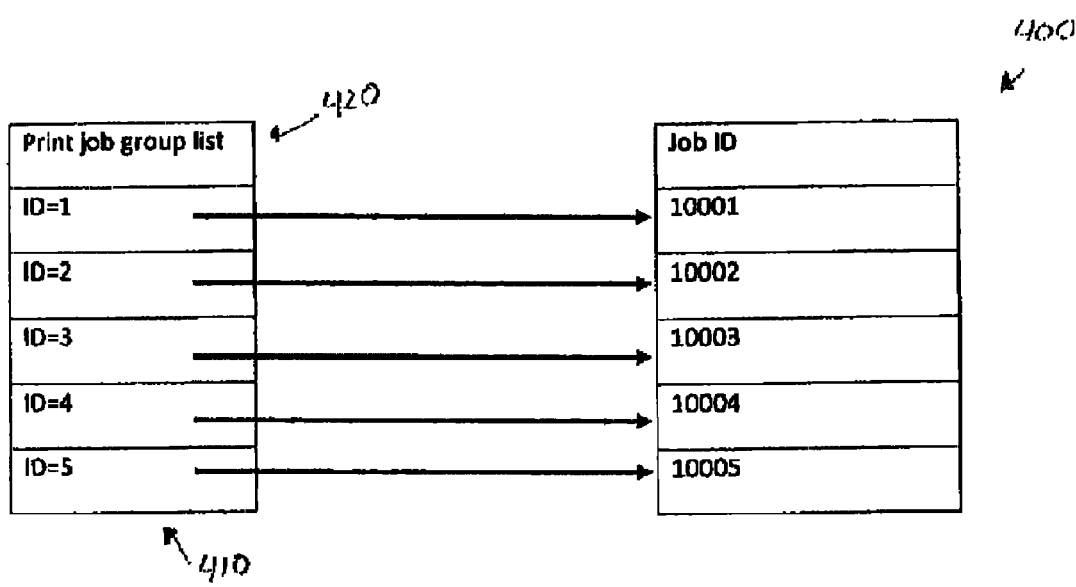
FIG. 4 is an illustration of a list of print jobs for an image forming apparatus or printer in accordance with another exemplary embodiment.

FIG. 4 is an illustration of a list of print jobs 400 for an image forming apparatus or printer 120 in accordance with an exemplary embodiment. As shown in FIG. 4, the print controller 122, 132 receives a plurality of print jobs 410 from one or more client devices 110 (i.e., Job ID 10001, Job 10002, Job 10003, Job 10004, and Job 10005). In accordance with an exemplary embodiment, before processing of the print jobs 410 for printing by the printer controller 122, 132, a print job group list 420 (i.e., ID=1, ID=2, ID=3, ID=4, ID=5) is created for the plurality of print jobs 410. The plurality of print jobs 410 are preferably identified in the print job group list 420 by an suitable identifier including numbers, job names, print job attributes and/or any combination thereof. It can be appreciated that by generating or creating a print job group list 420, the user can maintain the plurality of print jobs 410 in a desired sequence (or order) both before and after processing by the printer controller 122, 132.

Figure 5:
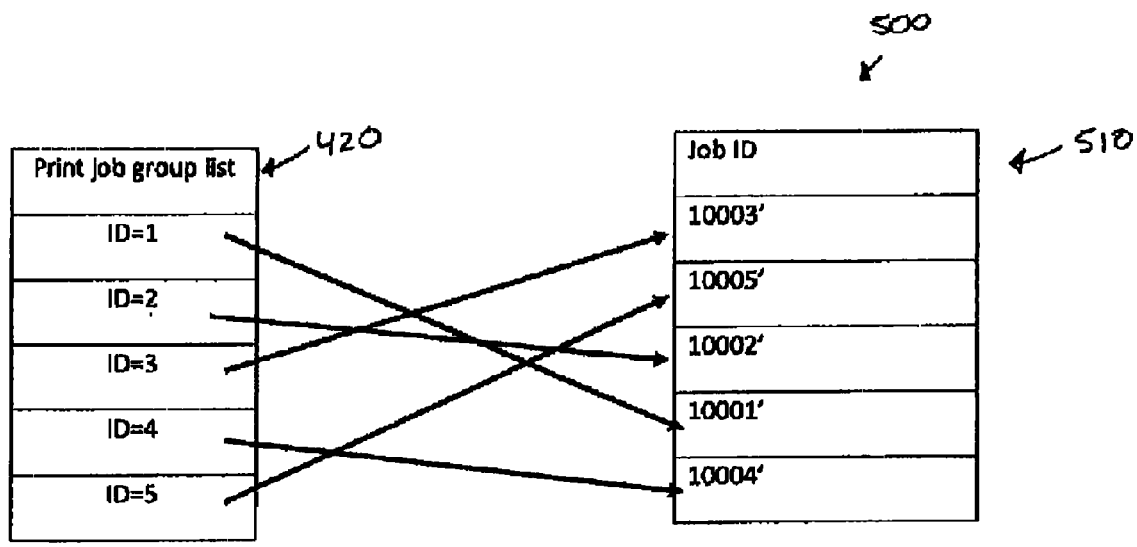
FIG. 5 is an illustration of a list of print jobs for an image forming apparatus or printer in accordance with an exemplary embodiment.

FIG. 5 is an illustration of a list of print jobs 500 for an image forming apparatus 120 or print server 130 in accordance with an exemplary embodiment. As shown in FIG. 5, after the controller 122, 132 processes each of the plurality of print jobs 410, the print job group list 420 will link to the new print job identity (or job identifier ("Job ID") for each of the print jobs, but the print job group list 420 will be kept as the same as before processing. The plurality of print jobs after processing by the printer controller 122, 132 for printing by an image forming apparatus 120 will include a new job identifier 510 (Job ID 10003', Job ID 10005', Job ID 10002', Job ID 10001', Job ID 10004'). However, it can be appreciated that by having a print job group list 420 available to the user, the plurality of print jobs 410 can be printed by the image forming apparatus 120 based on a printing sequence generated from the print job group list 420, rather than based on print job attributes and print job identifiers generated after processing by the print controller 122, 132. For example, even though the job sequence after the plurality of print jobs 410 has been processed has been modified and/or changed, the plurality of print jobs 410 can be printed in the sequence received by the printer controller 122, 132 based on the print job group list 420.

Figure 6:
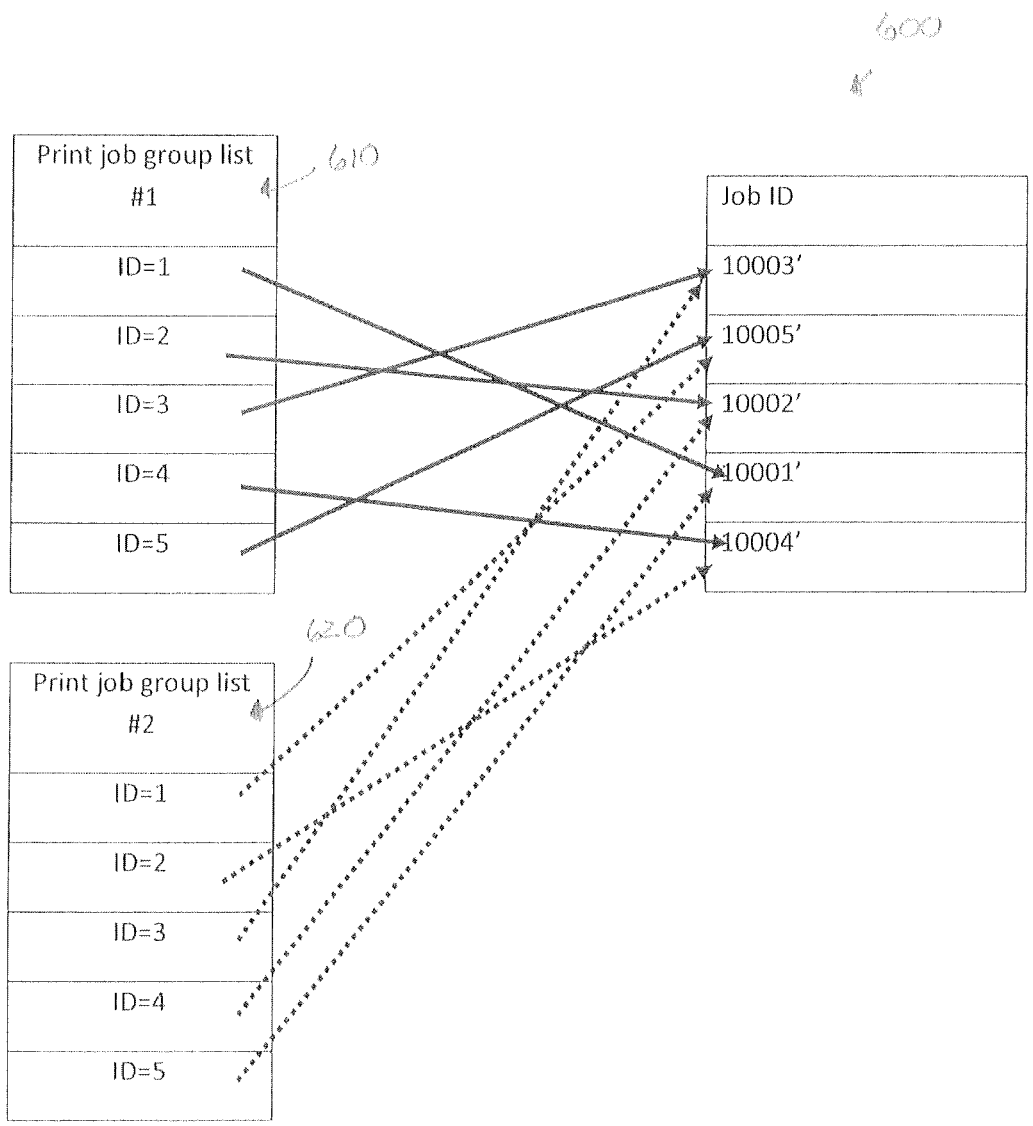
FIG. 6 is an illustration of a list of print jobs for an image forming apparatus or printer in accordance with another exemplary embodiment.

FIG. 6 is an illustration of a list of print jobs 600 for an image forming apparatus or printer in accordance with another exemplary embodiment. In accordance with another exemplary embodiment, a user can create any print job order (or printing sequence), which is not limited by the sorting capabilities of the plurality of print jobs. For example, as shown in FIG. 6, the user can create two print job group lists 610, 620, which provide the user full control of the printing sequence for the plurality of print jobs. It can be appreciated that when the user creates a print job group list 610, 620, with an arbitrary job sequence in the controller 122, 132, the user will have the full control of the print job printing sequence. Thus, the user is not limited by how the job sequence is changed due to job processing by the printer controller 122, 132.

Figure 7:
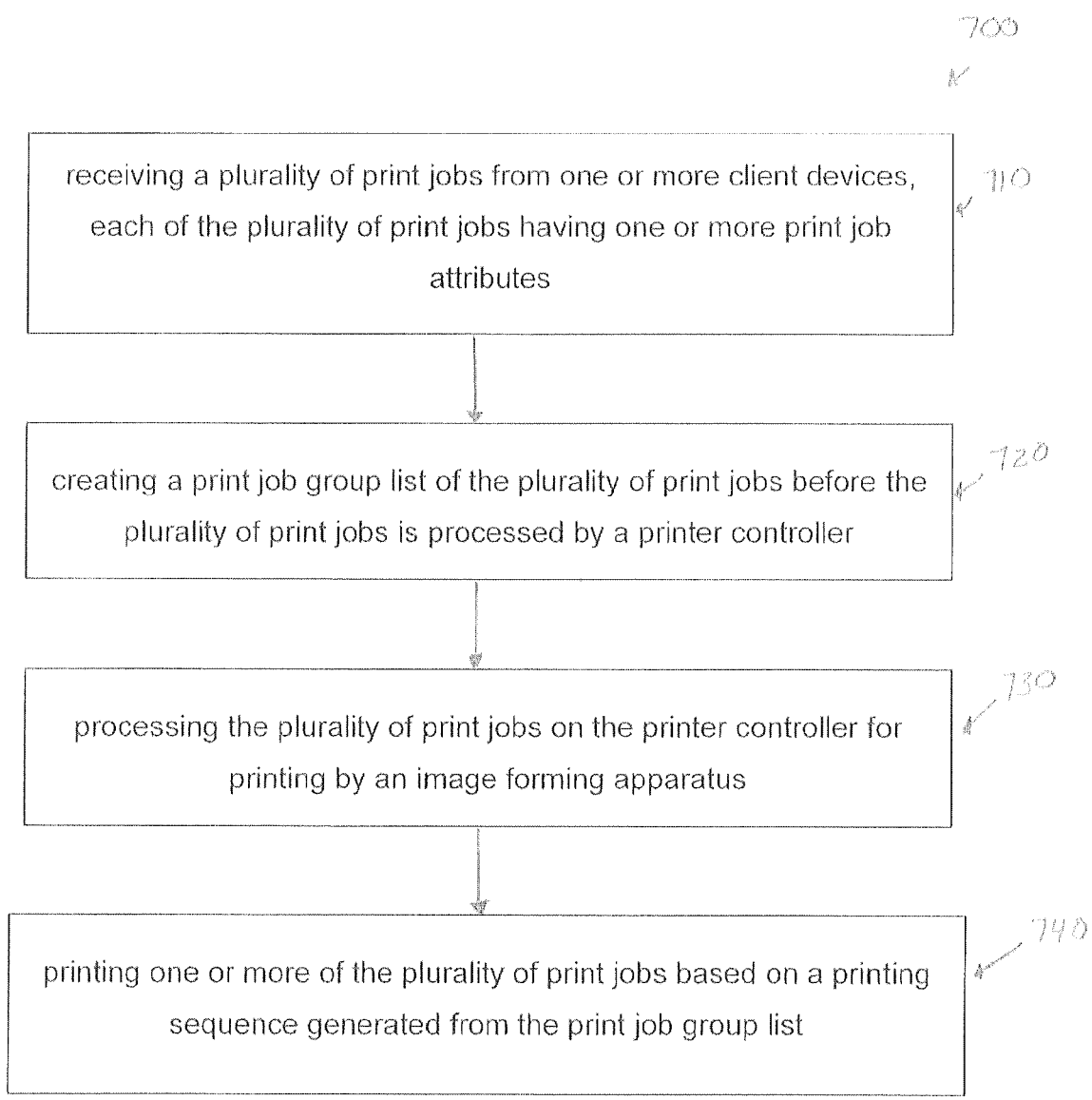
FIG. 7 is an illustration of a flow chart of a method of managing a plurality of print jobs in accordance with an exemplary embodiment.

FIG. 7 is an illustration of a flow chart of a method of managing a plurality of print jobs in accordance with an exemplary embodiment. As shown in FIG. 7, a method of managing a plurality of print jobs includes in step 710, receiving a plurality of print jobs from one or more client devices, each of the plurality of print jobs having one or more print job attributes. In step 720, creating a print job group list of the plurality of print jobs before each of the plurality of print jobs is processed by a printer controller. In step 730, processing the plurality of print jobs on the printer controller for printing by an image forming apparatus. In step 740, printing one or more of the plurality of print jobs based on a printing sequence generated from the print job group list.

In accordance with an exemplary embodiment, the print job group list 410 preferably has one or more print job attributes, which can include one or more of the following: a print job identifier, a print job name, a time of receipt of the print job, and/or a size of the print job before and/or after processing by the printer controller. For example, in a preferred embodiment, the printing or printing sequence of the plurality of print jobs is printed based on time of receipt of each of the plurality of print job on the printer controller of the image forming apparatus. However, it can be appreciated that by generating a print job group list, each user and/or group of users can print any of the print jobs by selecting one or more print job attributes upon completion of the processing of the print jobs by the controller. For example, the print jobs can be printed based on the size of the print job or print jobs, scheduled based on availability of the image forming apparatus or apparatuses, print job priority, and/or other needs or requirements as set forth by the users.

In accordance with an exemplary embodiment, the print job group list is preferably generated within the print controller associated with either a print server 130 or image forming apparatus 120. However, it can be appreciated that the print job group list can also be generated on a printer driver of a client device 110. Once the print job group list 420 is generated, the print job group list 420 is preferably stored on the printer controller of a server and/or image forming apparatus. It can be appreciated that the server and/or image forming apparatus preferably includes a hard disk drive and corresponding software application for managing the print job group list and printing sequence.

It can be appreciated that in accordance with an exemplary embodiment, the controlling of the printing and/or printing sequence of the print jobs within the print job group list 420 is preferably controlled via the one or more client devices 110. It can be appreciated that the print jobs 410 within the print job group list 420 can be stored on the print server 130 and/or image forming apparatus 120 until the user requests a print (or copy) thereof. Alternatively, it can be appreciated that a graphical user interface (GUI) (not shown) on the image forming apparatus 120 can be used to print at least one of the plurality of print jobs upon request.

In accordance with another exemplary embodiment, a computer program product comprising a non-transitory computer usable medium having a computer readable code embodied therein for managing a plurality of print jobs. The computer readable program code is configured to execute a process, which includes the steps of: receiving a plurality of print jobs from one or more client devices, each of the plurality of print jobs having one or more print job attributes; creating a print job group list of the plurality of print jobs before the plurality of print jobs is processed by a printer controller; processing the plurality of print jobs on the printer controller for printing by an image forming apparatus; and printing one or more of the plurality of print jobs based on a printing sequence generated from the print job group list.

The computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of managing a plurality of print jobs, comprising:
receiving a plurality of print jobs on a server from one or more client devices via a network connection, each of the plurality of print jobs having one or more print job attributes, the one or more print job attributes including a print job identifier;
creating a print job group list of the plurality of print jobs before the plurality of print jobs is processed by a printer controller on the server;
processing the plurality of print jobs on the printer controller on the server for printing by an image forming apparatus, each of the plurality of processed print jobs receiving a new job identifier, wherein an order of receipt of the plurality of print jobs on the printer controller is lost during the processing of the plurality of print jobs on the printer controller;
linking each of the new job identifiers to one of the plurality of print jobs in the print job group list;
sending the plurality of processed print jobs from the printer controller on the server via the network connection to the image forming apparatus; and
printing one or more of the plurality of print jobs on the image forming apparatus based on a printing sequence generated from the print job group list.

2. The method of claim 1, wherein the printing sequence generated from the print job group list is not affected by the processing of the plurality of print jobs by the printer controller.

3. The method of claim 1, wherein the printing sequence generated from the print job group list is based on a time of receipt of each of the plurality of print jobs by the printer controller.

4. The method of claim 1, wherein the print job attributes of each of the plurality of print jobs includes at least one or more of the following:
the print job identifier, a print job name, a time of receipt of the print job by the printer controller, and/or a size of the print job before processing by the printer controller.

5. The method of claim 1, further comprising generating at least two print job group lists for the plurality of print jobs.

6. The method of claim 5, wherein a printing sequence for each of the at least two print job group lists is based on at least one print job attribute for each of the plurality of print jobs.

7. The method of claim 1, comprising:
generating the generated printing sequence based on size of each of the plurality of print jobs, availability of the image forming apparatus, or a print job priority established by the one or more client devices.

8. A system for managing a plurality of print jobs:
at least one client device, which generates at least one print job;
a printer controller server having executable instructions for managing a plurality of print jobs, the instructions comprising:
receiving the plurality of print jobs from one or more client devices via a network connection, each of the plurality of print jobs having one or more print job attributes, the one or more print job attributes including a print job identifier;
creating a print job group list of the plurality of print jobs before the plurality of print jobs is processed by a printer controller on the printer controller server; and
processing the plurality of print jobs on the printer controller on the server for printing, each of the plurality of processed print jobs receiving a new job identifier, wherein an order of receipt of the plurality of print jobs on the printer controller is lost during the processing of the plurality of print jobs on the printer controller;
linking each of the new job identifiers to one of the plurality of print jobs in the print job group list; and
an image forming apparatus configured to receive the plurality of print jobs from the printer controller on the server via the network from the printer controller server and to print one or more of the plurality of print jobs based on a printing sequence generated from the print job group list.

9. The system of claim 8, wherein the image forming apparatus includes a print engine, an input/output section, and an image processing section.

10. The system of claim 8, wherein the printing sequence generated from the print job group list is based on a time of receipt of each of the plurality of print jobs by the printer controller server.

11. The system of claim 8, wherein the print job attributes of each of the plurality of print jobs includes at least one or more of the following: a print job identifier, a print job name, a time of receipt of the print job by the printer controller server, or a size of the print job before processing by the printer controller.

12. The system of claim 8, wherein the printer controller generates at least two print job group lists for the plurality of print jobs.

13. The system of claim 12, wherein a printing sequence for each of the at least two print job group lists is based on at least one print job attribute for each of the plurality of print jobs.

14. A computer program product comprising a non-transitory computer usable medium having a computer readable code embodied therein for managing a plurality of print jobs, the computer readable code configured to execute a process, the process comprising the steps of:
receiving a plurality of print jobs on a server from one or more client devices via a network connection, each of the plurality of print jobs having one or more print job attributes, the one or more print job attributes including a print job identifier;
creating a print job group list of the plurality of print jobs before the plurality of print jobs is processed by a printer controller on the server;
processing the plurality of print jobs on the printer controller on the server for printing by an image forming apparatus, each of the plurality of processed print jobs receiving a new job identifier, wherein an order of receipt of the plurality of print jobs on the printer controller is lost during the processing of the plurality of print jobs on the printer controller;
linking each of the new job identifiers to one of the plurality of print jobs in the print job group list;

sending the plurality of processed print jobs from the printer controller on the server via the network connection to the image forming apparatus; and printing one or more of the plurality of print jobs on the image forming apparatus based on a printing sequence generated from the print job group list.

15. The computer program product of claim 14, wherein the print job attributes of each of the plurality of print jobs includes at least one or more of the following:

the print job identifier, a print job name, a time of receipt of the print job by the printer controller, and/or a size of the print job before processing by the printer controller.

16. The computer program product of claim 14, further comprising printing the plurality of print jobs based on a time of receipt of each of the plurality of print job by the printer controller.

17. The computer program product of claim 14, further comprising generating at least two print job group lists based on at least one print job attribute for each of the plurality of print jobs.

18. The computer program product of claim 14, wherein the printing sequence generated from the print job group list is based on a time of receipt of each of the plurality of print jobs by the printer controller.

19. The computer program product of claim 14, wherein the print job attributes of each of the plurality of print jobs includes at least one or more of the following: a print job identifier, a print job name, a time of receipt of the print job by the printer controller, or a size of the print job before processing by the printer controller.

20. The computer program product of claim 14, wherein the printer controller generates at least two print job group lists for the plurality of print jobs, and wherein a printing sequence for each of the at least two print job group lists is based on at least one print job attribute for each of the plurality of print jobs.

\* \* \* \* \*